(12) United States Patent
Atchison et al.

(10) Patent No.: US 11,512,867 B2
(45) Date of Patent: Nov. 29, 2022

(54) REFRIGERANT DETECTION AND CONTROL OF HVAC SYSTEM

(71) Applicant: Johnson Controls Technology Company, Auburn Hills, MI (US)

(72) Inventors: Shaun B. Atchison, Wichita, KS (US); Brian D. Rigg, Douglass, KS (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 98 days.

(21) Appl. No.: 16/833,047

(22) Filed: Mar. 27, 2020

(65) Prior Publication Data

US 2021/0285680 A1    Sep. 16, 2021

Related U.S. Application Data

(60) Provisional application No. 62/988,761, filed on Mar. 12, 2020.

(51) Int. Cl.
| | | |
|---|---|---|
| *F24F 11/81* | (2018.01) | |
| *F24F 11/32* | (2018.01) | |
| *F24F 110/00* | (2018.01) | |

(52) U.S. Cl.
CPC .......... *F24F 11/81* (2018.01); *F24F 11/32* (2018.01); *F24F 2110/00* (2018.01)

(58) Field of Classification Search
CPC ......... F24F 11/36; F24F 11/32; F24F 2110/65
See application file for complete search history.

(56) References Cited

U.S. PATENT DOCUMENTS

| | | | | |
|---|---|---|---|---|
| 2,544,544 | A * | 3/1951 | Qualley ............... | F24F 11/30 392/350 |
| 5,263,892 | A * | 11/1993 | Vandervaart .......... | F25B 47/02 165/240 |
| 6,110,038 | A * | 8/2000 | Stern ................. | F24F 11/77 454/343 |
| 6,318,150 | B1 * | 11/2001 | Temple ............... | G01N 1/2258 432/32 |
| 7,696,891 | B2 * | 4/2010 | Whitney .............. | A62C 99/00 340/628 |
| 10,551,081 | B1 * | 2/2020 | Miller-Russell ....... | F24F 11/30 |
| 2005/0051295 | A1 * | 3/2005 | Yamanaka ............ | F25B 49/005 165/63 |
| 2017/0328620 | A1 * | 11/2017 | Ikawa ................ | F24F 11/89 |
| 2018/0038607 | A1 * | 2/2018 | Johnson .............. | G05D 23/19 |
| 2018/0045424 | A1 * | 2/2018 | Yajima ............... | F24F 11/30 |
| 2018/0187917 | A1 * | 7/2018 | Suzuki ............... | F25B 49/022 |
| 2018/0283725 | A1 * | 10/2018 | Ikawa ................ | F24F 1/0071 |
| 2019/0063808 | A1 * | 2/2019 | Suzuki ............... | F24F 1/0007 |
| 2019/0195523 | A1 * | 6/2019 | Mowris ............... | F24F 11/77 |

(Continued)

FOREIGN PATENT DOCUMENTS

| | | | | |
|---|---|---|---|---|
| JP | 2000146393 | A | * | 5/2000 |
| JP | 2020034253 | A | * | 3/2020 |

*Primary Examiner* — Nelson J Nieves
(74) *Attorney, Agent, or Firm* — Fletcher Yoder, P.C.

(57) ABSTRACT

A heating, ventilation, and/or air conditioning (HVAC) system includes a heat exchanger configured to exchange heat between a refrigerant and an air flow, a blower configured to induce the air flow across the heat exchanger, and a control board configured to receive an input indicative of a presence of refrigerant external to the heat exchanger and adjust operation of the blower based on the input.

15 Claims, 6 Drawing Sheets

(56) References Cited

U.S. PATENT DOCUMENTS

2019/0338971 A1\* 11/2019 Yoneyama .............. F24F 11/36
2020/0225653 A1\* 7/2020 Lamont .................. F24F 11/36
2021/0293430 A1\* 9/2021 Yamada .................. F24F 11/86

\* cited by examiner

REFRIGERANT DETECTION AND CONTROL OF HVAC SYSTEM

CROSS-REFERENCE TO RELATED APPLICATIONS

This application claims priority from and the benefit of U.S. Provisional Application Ser. No. 62/988,761, entitled "REFRIGERANT DETECTION AND CONTROL OF HVAC SYSTEM," filed Mar. 12, 2020, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A heating, ventilation, and/or air conditioning (HVAC) system may be used to thermally regulate an environment, such as a building, home, or other structure. The HVAC system may utilize a refrigerant that exchanges heat with a fluid, such as air or water, to cool or heat the fluid. The air may be supplied to the environment in order to condition the environment, or the water may be used heat or cool air or other fluids. The refrigerant may exchange heat with the fluid while disposed within a heat exchanger of the HVAC system. In some instances, during operation of the HVAC system, refrigerant may escape the HVAC system, such as at the heat exchanger or other component of the HVAC system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and/or air conditioning (HVAC) system includes a heat exchanger configured to exchange heat between a refrigerant and an air flow, a blower configured to induce the air flow across the heat exchanger, and a control board configured to receive an input indicative of a presence of refrigerant external to the heat exchanger and adjust operation of the blower based on the input.

In another embodiment, a non-transitory computer-readable storage medium for a heating, ventilation, and/or air conditioning (HVAC) system includes instructions that, when executed by a processor, cause the processor to receive an input indicative of a presence of refrigerant external to a heat exchanger of the HVAC system and adjust operation of a blower of the HVAC system based on the input.

In yet another embodiment, a heating, ventilation, and/or air conditioning (HVAC) system includes a heat exchanger configured to exchange heat between a refrigerant and an air flow, a blower configured to induce the air flow across the heat exchanger, and a control board. The control board includes a thermostat relay configured to selectively supply and suspend power to a thermostat of the HVAC system, a blower relay configured to selectively supply and suspend power to the blower, and a processor configured to control the thermostat relay and the blower relay. The processor is configured to receive an input indicative of a presence of the refrigerant external to the heat exchanger and adjust operation of the blower via the blower relay based on the input.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
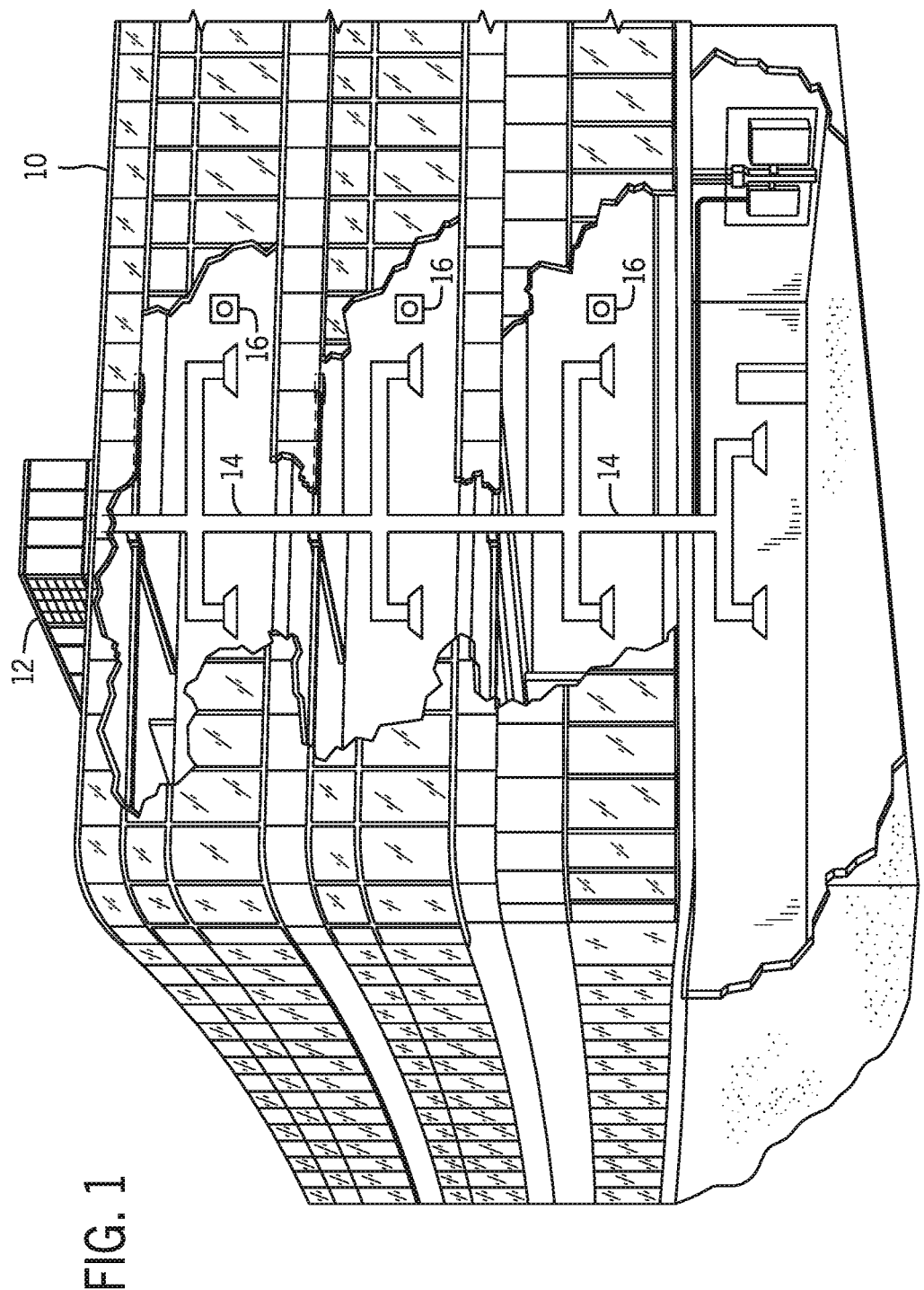
FIG. 1 is a perspective view of an embodiment of a heating, ventilation, and/or air conditioning (HVAC) system for building environmental management that may employ one or more HVAC units, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, a heating, ventilation, and/or air conditioning (HVAC) system may be used to thermally regulate an environment, such as a building, home, or other structure. For example, a circuit of the HVAC system may circulate a refrigerant that exchanges heat with an air flow to be provided to the environment, thereby cooling or heating the air flow. For example, a heat exchanger disposed along the circuit may route the refrigerant therethrough, and the air flow may be directed over or across the heat exchanger to facilitate heat exchange between the refrigerant and the air flow. In some instances, refrigerant may escape the HVAC system, such as at or proximate to the heat exchanger. For example, refrigerant may escape from a coupling between components of the heat exchanger, from tubing of the heat exchanger, from other portion(s) of the heat exchanger, and/or from other components of the HVAC system coupled to the heat exchanger. The escaped refrigerant may mix with the air flow and/or other fluids circulating through the HVAC system.

Accordingly, the present disclosure provides systems and methods configured to detect refrigerant escaped from the circuit of the HVAC system, such as refrigerant that is external to the heat exchanger of the HVAC system, and to control the HVAC system based on the detection. For example, the HVAC system may include a controller that receives an indication (e.g., a signal) that refrigerant is present outside of the heat exchanger. The signal may be received from a sensor of the HVAC system, such as a sensor disposed at or proximate to the heat exchanger that is configured to detect a presence of refrigerant. The controller may include a control board that controls operation of the HVAC system in response to the detected presence of refrigerant outside the heat exchanger. For example, in response to determining that refrigerant is present external to the heat exchanger, the control board may remove power from a thermostat of the HVAC system that enables and controls general (e.g., normal) operation of the HVAC system. As used herein, general operation of the HVAC system may include operation of heat exchanger(s), a compressor, expansion valve(s), and/or other components of the HVAC system to provide conditioning, operation in one or more standard operating modes (e.g., a heating mode, a cooling mode, a reheat mode, a dehumidification mode), operation based on a parameter (e.g., temperature, humidity) set point, and/or other suitable operations of the HVAC system. Additionally, in response to determining that refrigerant is detected external to the heat exchanger, the control board may supply power to a blower of the HVAC system that induces an air flow through or along the HVAC system, such as across the heat exchanger, thereby dispersing refrigerant that is located external to the heat exchanger.

In certain embodiments, in response to determining that refrigerant is present external to the heat exchanger, the control board may remove power from one or more other components (e.g., one or more components other than the thermostat) that enable general operation of the HVAC system. For example, the control board may remove power from another control system (e.g., a control system different from the thermostat) configured to enable and control general operation of the HVAC system. Additionally or alternatively, the control board may remove power from one or more other components of the HVAC system, such as a compressor, a heat exchanger, an expansion valve, and/or other suitable components. In such embodiments, the thermostat may be battery-powered, but operation and control of the HVAC system via the thermostat may be suspended (e.g., disabled) based on the control board removing power from the one or more other components of the HVAC system.

As discussed in detail below, controlling operation of the HVAC system based on the determination that refrigerant is present external to the heat exchanger enables the HVAC system to reduce or prevent additional refrigerant from escaping the heat exchanger, reduce an amount and/or a concentration of the refrigerant mixed with air adjacent to and/or flowing across the heat exchanger, and comply with certain industry standards. For example, suspending general operation of the HVAC system may reduce and/or prevent refrigerant from escaping the HVAC system. Further, inducing an air flow through the HVAC system (e.g., across the heat exchanger), via the blower, may facilitate dispersion of refrigerant in the air flow supplied to the conditioned environment and/or may direct refrigerant to another location separate from the conditioned environment, such as an enclosed cabinet of the HVAC system, an area outside a structure having the conditioned environment, or other suitable areas. Additionally, based on industry standards, it may be desirable to achieve reduced amounts or concentrations of refrigerant located external to the HVAC system and/or to adjust operation of the HVAC system within a specific period of time upon detection of refrigerant external to HVAC system components. As such, the systems and methods described herein improve/facilitate operation, maintenance, and management of the HVAC system.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be an air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, the HVAC unit 12 may supply the conditioned air to the building 10 via ductwork 14 extending throughout the building 10 from the HVAC unit 12. For example, the ductwork 14 may extend to various individual floors or other sections of the building 10. In some embodiments, the HVAC unit 12 may include a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other equipment, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10. In some embodiments, the HVAC unit 12 may operate in multiple zones of the building and may be coupled to multiple control devices that each control flow of air in a respective zone. For example, a first control device 16 may control the flow of air in a first zone 17 of the building, a second control device 18 may control the flow of air in a second zone 19 of the building, and a third control device 20 may control the flow of air in a third zone 21 of the building.

Figure 2:
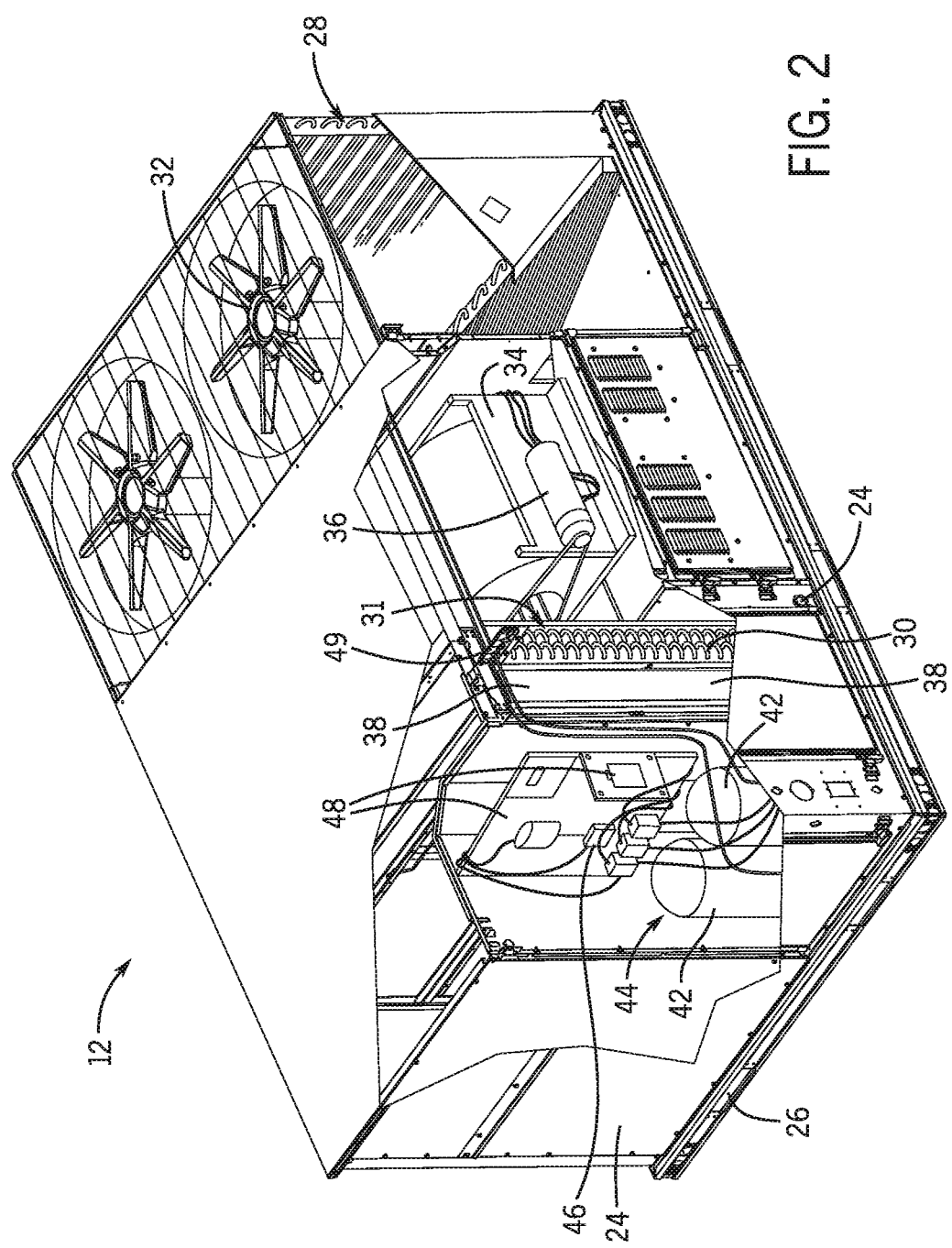
FIG. 2 is a perspective view of an embodiment of a packaged HVAC unit, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 or enclosure encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board or controller 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
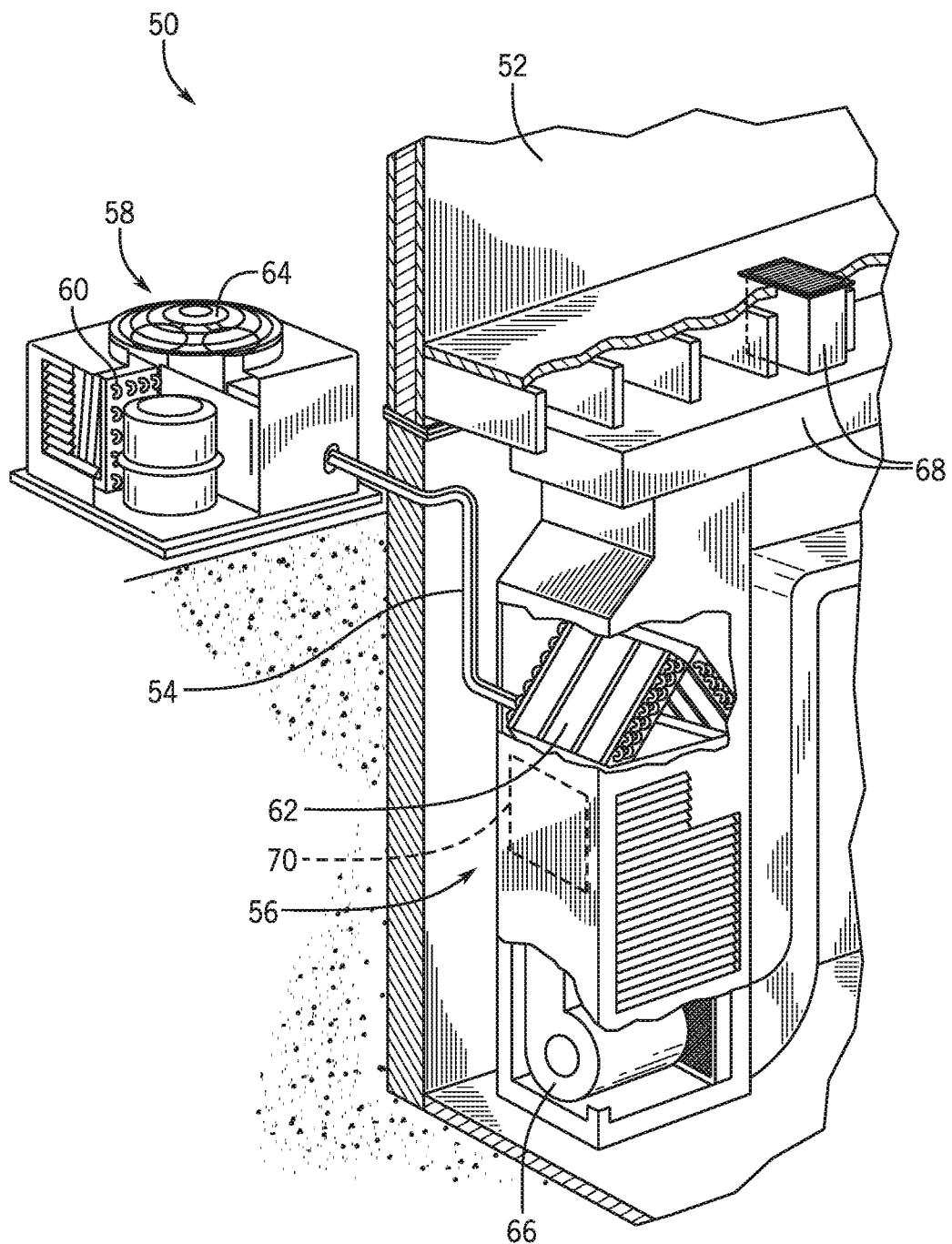
FIG. 3 is a perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
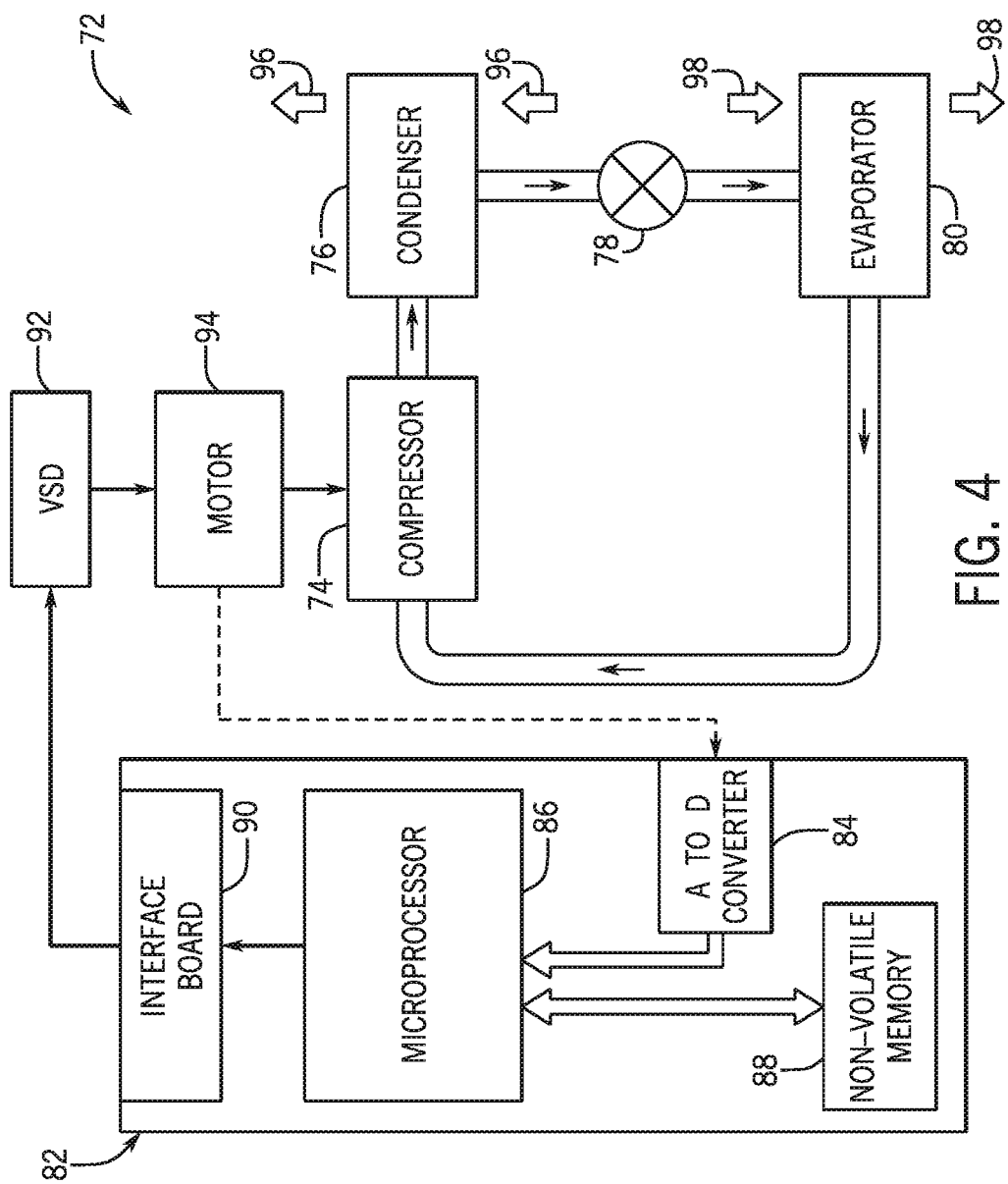
FIG. 4 is a schematic of an embodiment of a vapor compression system that may be used in an HVAC system, in accordance with an aspect of the present disclosure.

FIG. 4 is an embodiment of a vapor compression system 72 that may be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that may be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference to FIGS. 1-4 is intended to be illustrative of the context of the present disclosure. The techniques of the present disclosure may be incorporated with any or all of the features described above, as well as other systems not described above. In particular, as will be discussed in more detail below, the present disclosure provides techniques for controlling operation of an HVAC system based on a detected presence of refrigerant external a heat exchanger and/or a circuit of the HVAC system. For example, a control board of the HVAC system may suspend general or normal operation of the HVAC system and may control operation of a blower configured to induce an air flow across the heat exchanger in response to the detection of refrigerant external to the heat exchanger.

Figure 5:
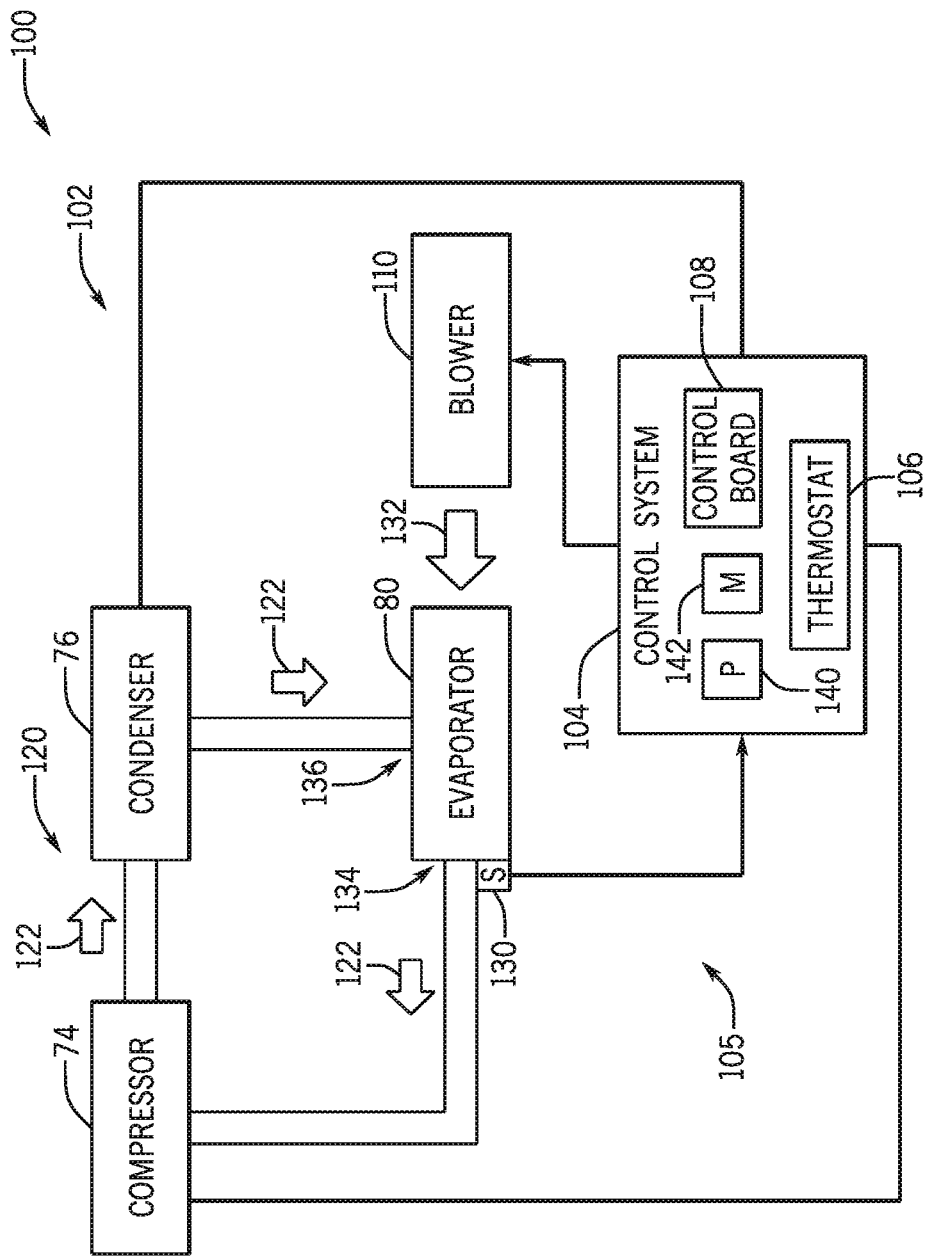
FIG. 5 is a schematic of an embodiment of an HVAC system having a refrigerant detection and control system, in accordance with an aspect of the present disclosure.

To help illustrate, FIG. 5 is a schematic of an HVAC system 100 having an HVAC unit 102 and a control system 104 (e.g., a controller) configured to control operation of the HVAC unit 102 and/or the HVAC system 100 generally. The illustrated HVAC system 100 may include embodiments or components of the HVAC unit 12 shown in FIG. 1, embodiments or components of the residential heating and cooling system 50 shown in FIG. 3, a rooftop unit (RTU), or any other suitable HVAC system. The HVAC unit 102, or portion(s) thereof, may be positioned indoors and/or outdoors, such that the HVAC unit 102 may be an indoor unit and/or an outdoor unit. As described in greater detail below, a thermostat 106 of the control system 104 may control general and/or normal operation of the HVAC unit 102, such as based on a selected operating mode or a parameter set point. To this end, the thermostat 106 may be configured to provide control signals to the HVAC unit 102 in order to operate in one or more normal operating modes (e.g., a heating mode, a cooling mode).

In accordance with present techniques, the HVAC system 100 includes a refrigerant detection and control system 105 configured to detect a presence of refrigerant external to components of the HVAC unit 102 configured to circulate refrigerant. To this end, the control system 104 includes a control board 108 that may enable or suspend general operation of the HVAC unit 102 based on refrigerant detection. For example, in response to refrigerant detection, the control board 108 may suspend supply of power to the thermostat 106, thereby suspending normal operation of the HVAC unit 102. While operation of the HVAC unit 102 via the thermostat 106 is suspended, the control board 108 may enable an alternate operating mode of the HVAC unit 102. In the alternate operating mode, a blower 110 of the HVAC unit 102 may induce an air flow across a heat exchanger and/or other portions of the HVAC unit 102 proximate to which refrigerant is detected. In this manner, operation of the blower 110 enables dispersing of refrigerant that is detected external to the heat exchanger. Thus, the control board 108 enables the HVAC system 100 to switch between a general operating mode and an alternate operating mode based on the detection of refrigerant external to the heat exchanger.

While the control board 108 is illustrated as being electrically coupled to the HVAC unit 102 via the thermostat 106, in some embodiments, the control board 108 may be electrically coupled to one or more components of the HVAC unit 102. In such embodiments, in response to determining that refrigerant is present external to the heat exchanger, the control board 108 may remove power from the one or more other components (e.g., one or more components other than the thermostat) that enable general operation of the HVAC unit 102 or may otherwise disable operation of such components. For example, the control board 108 may remove power from another control system (e.g., a control system different from the thermostat) configured to enable and control general operation of the HVAC unit 102. Additionally or alternatively, the control board 108 may remove power from one or more other components of the HVAC unit 102, such as a compressor, a heat exchanger, an expansion valve, and/or other suitable components. In such embodiments, the thermostat 106 may be battery-powered, but operation and control of the one or more other components of the HVAC unit 102, via the thermostat 106, may be suspended (e.g., disabled) based on the control board 108 removing power from the one or more other components of the HVAC unit 102.

As illustrated, the HVAC unit 102 includes the compressor 74, the condenser 76, and the evaporator 80. The HVAC unit 102 is configured to circulate refrigerant along a circuit 120 including the compressor 74, the condenser 76, and the evaporator 80, as indicated by arrows 122. As generally described above, refrigerant within the circuit 120 may exchange heat with a working fluid (e.g., air, water) at the evaporator 80, for example, by evaporating and heating the refrigerant and cooling the working fluid. In certain embodiments, the HVAC unit 102 may include additional or other components disposed along the circuit 120, such as components described in reference to FIGS. 1-4. Additionally, the HVAC unit 102 includes the blower 110 and a sensor 130. The blower 110 is configured to direct an air flow across and/or through the evaporator 80, as indicated by arrow 132. In certain embodiments, the blower 110 may be the blower 66 that directs air across the evaporator 80 and into ductwork for delivery to a conditioned environment. In some embodiments, the blower 110 may direct air across the evaporator 80 and into an area of the HVAC system 100 separate from a conditioned environment, such as another compartment/cabinet of the HVAC system 100, an outdoor area, or another suitable area. The control system 104 and/or the refrigerant detection and control system 105 may include the sensor 130. Additionally, the control system 104 may include the refrigerant detection and control system 105, or the refrigerant detection and control system 105 may include the control system 104.

In some instances, refrigerant may escape from the circuit 120, such as from tubing (e.g., a coil) within or adjacent to the evaporator 80. The sensor 130 may detect a presence of refrigerant (e.g., R-1234yf, R-1234ze, R-32, R-454A, R-454C, R-455A, R-447A, R-452B, R-454B, etc.) external to the evaporator 80 and may provide feedback (e.g., an input) to the control system 104 indicative of the presence of refrigerant external to the evaporator 80. More specifically, the sensor 130 may provide the feedback to the control board 108 of the control system 104. As illustrated, the sensor 130 is positioned at an outlet 134 of the evaporator 80. However, in certain embodiments, the sensor 130 may be positioned at an inlet 136 of the evaporator 80 and/or at other locations adjacent to the evaporator 80 (e.g., proximate, above, or below tubing of the evaporator 80). In some embodiments, refrigerant external to the evaporator 80 may settle generally below the evaporator 80 (e.g., relative to gravity), and the sensor 130 may therefore be positioned below the evaporator 80 in order to detect the presence of refrigerant external to and generally below the evaporator 80.

The control system 104 may receive feedback from the sensor 130 and may control the HVAC unit 102 based on the feedback. For example, the control system 104, via the control board 108, may enable general operation of the HVAC unit 102 by supplying power to the thermostat 106 in the absence of feedback received from the sensor 130 indicating that refrigerant is external to the evaporator 80. Thus, the thermostat 106 may control the HVAC unit 102 to operate in a heating operating mode, in a cooling operating mode, based on a temperature set point, based on a humidity set point, and/or based on other operating modes, set points, and other parameters when the control system 104 (e.g., the control board 108) does not receive feedback indicating that refrigerant is detected external to the evaporator 80. In certain embodiments, such as embodiments of the HVAC system 100 including a battery-powered thermostat 106, the control system 104, via the control board 108, may enable general operation of the HVAC unit 102 by supplying power to one or more components of the HVAC unit 102 in the absence of feedback received from the sensor 130 indicating that refrigerant is external to the evaporator 80.

Additionally, the control system 104, via the control board 108, may suspend general operation of the HVAC unit 102 (e.g., suspend control of the HVAC unit 102 via the thermostat 106) in response to receiving feedback from the sensor 130 indicating that refrigerant is detected external to the evaporator 80. Specifically, based on feedback from the sensor 130 indicative of detected refrigerant, the control board 108 may suspend supply of power to the thermostat 106, thereby suspending control of the HVAC unit 102 via the thermostat 106. In certain embodiments, such as embodiments of the HVAC system 100 including a battery-powered thermostat 106, the control system 104, via the control board 108, may suspend supply of power to one or more components of the HVAC unit 102 in response to receiving feedback from the sensor 130 indicating that refrigerant is detected external to the evaporator 80, thereby suspending general operation of the HVAC unit 102. Further, the control system 104, via the control board 108, may cause the blower 110 to generate and direct the air flow 132 across the evaporator 80 in response to receiving feedback from the sensor 130 indicating that refrigerant is detected external to the evaporator 80. In particular, the control board 108 may enable supply of power to the blower 110 based on the feedback indicative of detected refrigerant.

In certain embodiments of the alternate operating mode, the control system 104, via the control board 108, may operate the blower 110 for a predetermined time period prior to resuming general operation of the HVAC unit 102 via the thermostat 106. That is, upon expiration of the predetermined period of time, the control board 108 may resume supply of power to the thermostat 106. The predetermined time period may be 10 seconds, 20 seconds, 30 seconds, 1 minute, 2 minutes, 3 minutes, 4 minutes, 5 minutes, 6 minutes, 7 minutes, 8 minutes, 9 minutes, 10 minutes, 15 minutes, 20 minutes, 1 hour, or other suitable time periods.

In some embodiments, after operating the blower 110 in accordance with the alternate operating mode, such as for the predetermined time period, the control system 104 may block operation of the blower 110, the HVAC unit 102, and/or the HVAC system 100 for another predetermined time period (e.g., 10 seconds, 20 seconds, 30 seconds, 1 minute, 2 minutes, 3 minutes, 4 minutes, 5 minutes, 6 minutes, 7 minutes, 8 minutes, 9 minutes, 10 minutes, 15 minutes, 20 minutes, 1 hour). In certain embodiments, the control system 104 may operate the blower 110 to generate a particular flow rate of air flow across the evaporator 80, as indicated by arrow 132. For example, the particular flow rate may be 10 cubic feet per minute (CFM) per ton of HVAC system 100 cooling capacity, 50 CFM per ton of cooling capacity, 100 CFM per ton of cooling capacity, 200 CFM per ton of cooling capacity, 300 CFM per ton of cooling capacity, 400 CFM per ton of cooling capacity, 500 CFM per ton of cooling capacity, 600 CFM per ton of cooling capacity, 800 CFM per ton of cooling capacity, 1000 CFM per ton of cooling capacity, 2000 CFM per ton of cooling capacity, or other suitable flowrates. The control system 104 may determine the time period for operating the blower 110, the time period during which operation of the blower 110, the HVAC unit 102, and/or the HVAC system 100 is blocked, and/or the flow rate provided by the blower 110 based on a type of refrigerant utilized within the HVAC system 100 (and therefore detected by the sensor 130), a configuration and/or a size of the evaporator 80, and/or any other suitable factors. As used herein, the configuration of the evaporator 80 and/or another heat exchanger may include a number of heat exchanger slabs, an orientation of heat exchanger slabs, a configuration of heat exchanger tubes (e.g, microchannel), a configuration of fins, and other aspects of a heat exchanger configuration.

In some embodiments, the feedback from the sensor 130 may indicate an amount of refrigerant (e.g., a volume) and/or a concentration (e.g., parts per million) of refrigerant relative to other fluid(s) (e.g., air, water). The control system 104, via the control board 108, may control operation of the HVAC unit 102 (e.g., in the alternate operating mode) based on the amount and/or the concentration of refrigerant. For example, in response to the amount and/or concentration of refrigerant exceeding a threshold value, the control system 104, via the control board 108, may suspend general operation of the HVAC unit 102 and may operate the blower 110 according to the alternate operating mode. In response to the amount and/or concentration of detected refrigerant not exceeding the threshold value and/or falling below the threshold value, the control system 104, via the control board 108, may resume and enable general operation of the HVAC unit 102 via the thermostat 106. The threshold value of the concentration of refrigerant in air may be 0.010 pounds of refrigerant per cubic foot of air (pounds per cubic foot), 0.015 pounds per cubic foot, 0.020 pounds per cubic foot, 0.025 pounds per cubic foot, 0.030 pounds per cubic foot, 0.040 pounds per cubic foot, or any other suitable concentrations. In certain embodiments, the control system 104 may determine the concentration of refrigerant in air based on the feedback indicative of the amount of refrigerant external to the evaporator 80 and/or other component of the HVAC unit 102. The control system 104 may determine the threshold value based on a type of refrigerant, a configuration and/or a size of the evaporator 80, and/or any other suitable factors.

The control system 104 may include processor circuitry 140 and a memory 142. The processor circuitry 140 may be configured to execute software, such as software stored in the memory 142, configured to receive information from components of the HVAC system 100, send information and/or commands to components of the HVAC system 100, and/or otherwise adjust and/or control the HVAC system 100. Moreover, the processor circuitry 140 may include multiple microprocessors, one or more "general-purpose" microprocessors, one or more special-purpose microprocessors, and/or one or more application specific integrated circuits (ASICS), or some combination thereof. For example, the processor circuitry 140 may include one or more reduced instruction set (RISC) or complex instruction set (CISC) processors. The memory 142 may include a volatile memory, such as random access memory (RAM), and/or a nonvolatile memory, such as read-only memory (ROM). The memory 142 may store a variety of information and may be used for various purposes. That is, the memory 142 may store data, executable instructions, and/or any other suitable data. For example, the memory 142 may store processor-executable instructions, such as firmware or software for controlling the HVAC system 100, for the processor circuitry 140 to execute. The memory 142 may include ROM, flash memory, a hard drive, or any other suitable optical, magnetic, or solid-state storage medium, or a combination thereof.

The processor circuitry 140 and/or the memory 142 may be located in any suitable portion of the HVAC system 100. The memory 142 may be any suitable article of manufacture that can serve as a medium to store processor-executable code, data, or the like. These articles of manufacture may represent computer-readable medium or any suitable form of memory or storage that may store the processor-executable code used by the processor circuitry 140 to perform the presently disclosed techniques. The memory 142 may represent a non-transitory computer-readable storage medium or any suitable form of memory or storage that may store the processor-executable code for execution by the processor circuitry 140. It should be noted that "non-transitory" merely indicates that the medium is tangible and not a signal. In certain embodiments, the memory 142 may be a cloud-based memory and/or the control system 104 may access the cloud-based memory.

Figure 6:
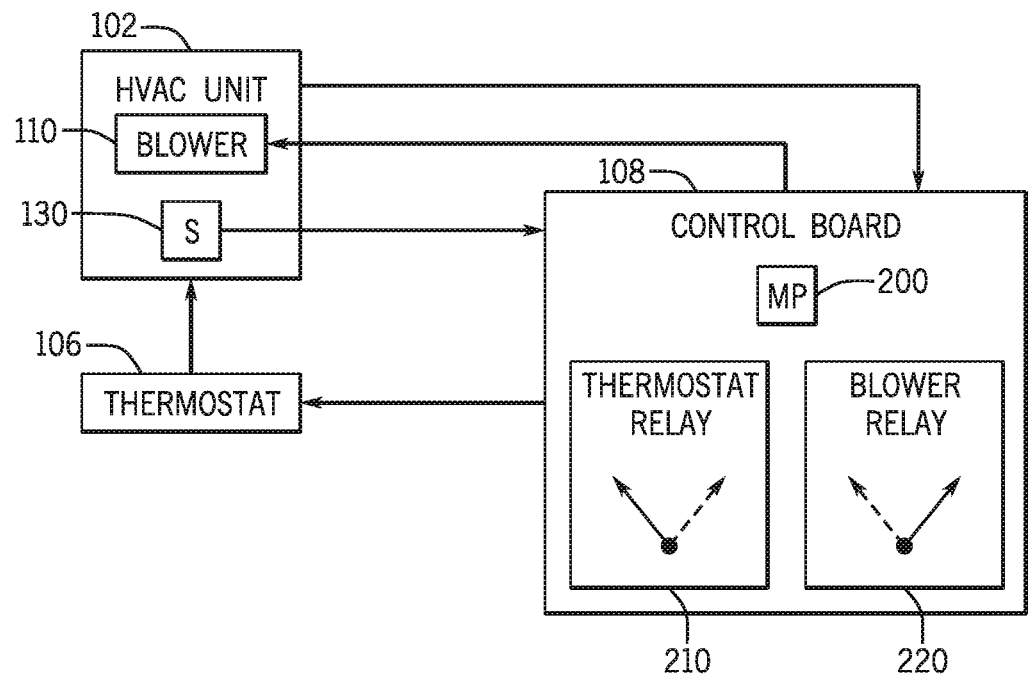
FIG. 6 is a schematic of an embodiment of an HVAC system having a refrigerant detection and control system, in accordance with an aspect of the present disclosure.
Figure 7:
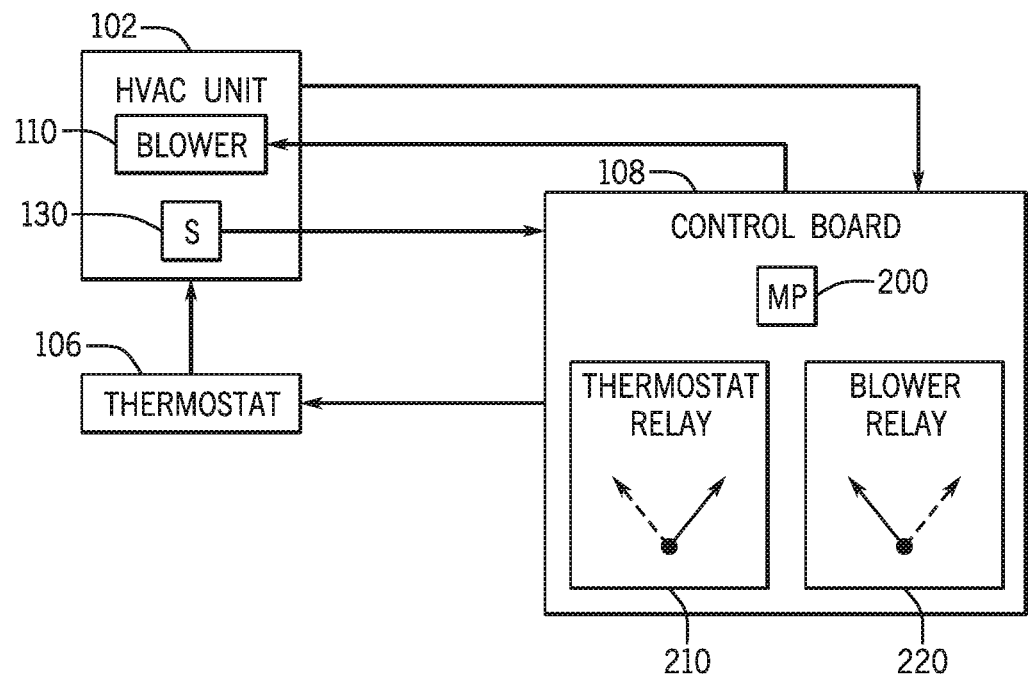
FIG. 7 is a schematic of an embodiment of an HVAC system having a refrigerant detection and control system, in accordance with an aspect of the present disclosure.

FIG. 6 is a schematic of an embodiment of the HVAC system 100 including the HVAC unit 102, the thermostat 106, and the control board 108. As illustrated, the control board 108 includes a microprocessor 200, a thermostat relay 210 in a closed position, and a blower relay 220 in an open position. Additionally, FIG. 7 is a schematic of an embodiment of the control board 108 illustrating the thermostat relay 210 is in an open position and the blower relay 220 in a closed position. The microprocessor 200 may switch the thermostat relay 210 and the blower relay 220 between the open and closed positions based on feedback from the sensor 130. For example, based on feedback from the sensor 130 indicating that refrigerant is not detected external to the evaporator 80 (e.g., any detected refrigerant is below a threshold value) and/or in the absence of feedback from the sensor 130 indicating that refrigerant is detected external to the evaporator 80, the microprocessor 200 may control the thermostat relay 210 to be in the closed position and the blower relay 220 to be in the open position, as illustrated in FIG. 6. Based on feedback from the sensor 130 indicating that refrigerant is detected external to the evaporator 80, the microprocessor 200 may switch the thermostat relay 210 to the open position and switch the blower relay 220 to the closed position, as illustrated in FIG. 7.

In the closed position, the thermostat relay 210 enables operation of the HVAC unit 102 via the thermostat 106. For example, in the closed position, the thermostat relay 210 enables supply of power to the thermostat 106. More specifically, the closed thermostat relay 210 enables supply of power from HVAC unit 102 to the thermoset 106 via the control board 108 and the thermostat relay 210. As such, the thermostat relay 210 may be in the closed position during general operation of the HVAC unit 102. In the open position, the thermostat relay 210 may suspend operation of the HVAC unit 102 via the thermostat 106 by interrupting supply of power to the thermostat 106. In this way, operation of components of the HVAC unit 102, such as the compressor 74, are suspended, which may reduce or prevent refrigerant from escaping the evaporator 80. In certain embodiments, in the closed position, the thermostat relay 210 may enable supply of power to one or more components of the HVAC unit 102, such as embodiments including a battery-powered thermostat 106. In such embodiments, in the open position, the thermostat relay 210 may suspend operation of the HVAC unit 102 by interrupting supply of power to the one or more components of the HVAC unit 102.

In the open position, the blower relay 220 may suspend operation of the blower 110 via the control board 108. For example, when the blower relay 220 is open, the control board 108 does not supply power to the blower 110. However, in certain embodiments, the HVAC system 100 may still be configured to operate the blower 110 in another manner while the blower relay 220 is in the open position of FIG. 6, such as during an operating mode (e.g., normal operating mode) that includes operation of the blower 110. In the closed position, the blower relay 220 may enable operation of the blower 110, thereby enabling the blower 110 to generate and direct air flow over or through the evaporator 80 to disperse refrigerant present external to the evaporator 80. For example, the blower relay 220 may complete (e.g., close) an electrical circuit connected to the HVAC unit 102, the control board 108, and the blower 110 while in the closed position. In this way, power is supplied from the HVAC unit 102 to the blower 110 via the control board 108 and the closed blower relay 220. The thermostat relay 210 and the blower relay 220 may be an electrical relay, a mechanical relay, an electro-mechanical relay, a magnetic relay, and/or any other suitable relay.

The microprocessor 200 may control (e.g., switch) the thermostat relay 210 and the blower relay 220 between the open and closed positions based on a voltage signal received from the sensor 130. The voltage signal may indicate the presence or absence of refrigerant external to the evaporator 80. For example, based on the voltage exceeding a threshold value, the microprocessor 200 may switch the thermostat relay 210 from the closed position of FIG. 6 to the open position of FIG. 7 and may switch the blower relay 220 from the open position of FIG. 6 to the closed position of FIG. 7. The threshold value may be 1 VDC, 2 VDC, 3 VDC, 3.5 VDC, 4 VDC, 5 VDC, or other suitable voltages. In some embodiments, based on the voltage being outside a threshold range, the microprocessor 200 may switch the thermostat relay 210 from the closed position of FIG. 6 to the open position of FIG. 7 and may switch the blower relay 220 from the open position of FIG. 6 to the closed position of FIG. 7. A lower limit of the threshold range may be 0.1 VDC, 0.2 VDC, 0.5 VDC, 1 VDC, 2 VDC, or other suitable voltages. An upper limit of the threshold range may be 2 VDC, 3 VDC, 4 VDC, 4.5 VDC, 5 VDC, 6 VDC, and other suitable voltages. In certain embodiments, components of the HVAC system 100, such as the sensor 130, the control board 108, portion(s) of the control board 108 (e.g., the microprocessor 200, the thermostat relay 210, the blower relay 220), the thermostat 106, portion(s) of the thermostat 106, the HVAC unit 102, portion(s) of the HVAC unit 102, may communicate with one another via Universal Asynchronous Receiver/Transmitter (UART) communication and/or via serial communication (e.g., RS-485/232).

After operating the blower 110 for a specific time period (e.g., in the alternate operating mode with the thermostat relay 210 in the open position and the blower relay 220 in the closed position of FIG. 7), the microprocessor 200 may switch the thermostat relay 210 back to the closed position and the blower relay 220 to the open position, as illustrated in FIG. 6. As described above, the specific time period for operating the blower 110 may be any suitable time period, such as 5 minutes.

Accordingly, the present disclosure provides systems and methods configured to detect refrigerant external to a circuit of an HVAC system, such as refrigerant that is external to a heat exchanger of the HVAC system, and configured to control the HVAC system based on the detection. For example, in response to determining that refrigerant (e.g., a threshold amount or concentration of refrigerant) is present external to the heat exchanger, a control board of the HVAC system may suspend supply of power to a thermostat of the HVAC system that operates to enable and control general (e.g., normal) operation of the HVAC system. Additionally, in response to determining that refrigerant is detected external to the heat exchanger, the control board may supply power to a blower of the HVAC system that induces an air flow through or along the HVAC system, such as across the heat exchanger, thereby dispersing refrigerant that is located external to the heat exchanger. Controlling operation of the HVAC system based on the determination that refrigerant is present external to the heat exchanger enables the HVAC system to reduce or prevent additional refrigerant from escaping the heat exchanger or other portion of the refrigerant circuit, reduce an amount and/or a concentration of the refrigerant mixed with air adjacent to and/or flowing across the heat exchanger, and/or comply with certain industry standards. As such, the systems and methods described herein improve/facilitate operation, maintenance, and management of the HVAC system.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A heating, ventilation, and/or air conditioning (HVAC) system, comprising:
    a heat exchanger configured to exchange heat between a refrigerant and an air flow;
    a blower configured to induce the air flow across the heat exchanger;
    a thermostat configured to enable control of the HVAC system in a normal operating mode;
    a thermostat relay configured to relay a power supply to the thermostat; and
    a control board configured to:
        receive an input indicative of a presence of refrigerant external to the heat exchanger, wherein the input comprises a voltage;
        adjust operation of the blower based on the input by enabling an additional power supply to the blower in response to the voltage exceeding a threshold value; and
        adjust the thermostat relay based on the input by suspending the power supply to the thermostat of the HVAC system in response to the voltage exceeding the threshold value.

2. The HVAC system of claim 1, comprising a sensor configured to provide the input indicative of the presence of refrigerant external to the heat exchanger to the control board, wherein the sensor is disposed proximate to the heat exchanger.

3. The HVAC system of claim 1, wherein the heat exchanger comprises an evaporator configured to exchange heat between the air flow and the refrigerant.

4. The HVAC system of claim 1, wherein the control board is configured to adjust the thermostat relay to enable the power supply to the thermostat relay in the normal operating mode of the HVAC system.

5. The HVAC system of claim 1, wherein the control board is configured to enable the power supply to the thermostat of the HVAC system by actuating the thermostat relay to a closed position in the normal operating mode of the HVAC system, and wherein the control board is configured to suspend the power supply to the thermostat by actuating the thermostat relay to an open position in response to the voltage exceeding the threshold value.

6. The HVAC system of claim 5, comprising a blower relay configured to relay the additional power supply to the blower in an additional closed position of the blower relay and suspend the additional power supply to the blower in an additional open position of the blower relay.

7. A non-transitory computer-readable storage medium for a heating, ventilation, and/or air conditioning (HVAC) system comprising instructions that, when executed by a processor, cause the processor to:
    receive an input indicative of a presence of refrigerant external to a heat exchanger of the HVAC system;
    adjust operation of a blower of the HVAC system by enabling a power supply to the blower based on the input; and
    suspend a normal operating mode of the HVAC system by suspending an additional power supply to a thermostat of the HVAC system based on the input.

8. The non-transitory computer-readable storage medium of claim 7, wherein the input indicative of the presence of refrigerant is indicative of an amount of refrigerant, and wherein the instructions, when executed by the processor, cause the processor to:
    determine a concentration of refrigerant in air based on the amount of refrigerant;
    adjust the operation of the blower by enabling the power supply to the blower in response to the concentration of refrigerant in air exceeding a threshold value; and
    suspend the normal operating mode of the HVAC system by suspending the additional power supply to the thermostat of the HVAC system in response to the concentration of refrigerant in air exceeding the threshold value.

9. The non-transitory computer-readable storage medium of claim 8, wherein the instructions, when executed by the processor, cause the processor to determine the threshold value based on a type of the refrigerant, a configuration of the heat exchanger, a size of the heat exchanger, or a combination thereof.

10. The non-transitory computer-readable storage medium of claim 7, wherein the instructions, when executed by the processor, cause the processor to operate the HVAC system in a normal operating mode based on an absence of the input.

11. The non-transitory computer-readable storage medium of claim 7, wherein the instructions, when executed by the processor, cause the processor to:
actuate a thermostat relay to a closed position to enable the thermostat relay to relay the additional power supply to the thermostat in the normal operating mode of the HVAC system; and
actuate, in response to the input, the thermostat relay to an open position to block the thermostat relay from relaying the additional power supply to the thermostat.

12. A heating, ventilation, and/or air conditioning (HVAC) system, comprising:
a heat exchanger configured to exchange heat between a refrigerant and an air flow;
a blower configured to induce the air flow across the heat exchanger; and
a control board comprising:
a thermostat relay configured to selectively supply and suspend power to a thermostat of the HVAC system;
a blower relay configured to selectively supply and suspend additional power to the blower; and
a processor configured to control the thermostat relay and the blower relay, wherein the processor is configured to:
receive an input indicative of a presence of the refrigerant external to the heat exchanger;
adjust operation of the blower via control of the blower relay based on the input; and
actuate the thermostat relay to an open position in response to the input, wherein the thermostat relay in the open position is configured to suspend the power to the thermostat.

13. The HVAC system of claim 12, wherein the processor is configured to adjust the blower relay to a closed position to supply the additional power to the blower in response to the input.

14. The HVAC system of claim 12, comprising the thermostat, wherein the thermostat is configured to enable a normal operating mode of the HVAC system, and wherein the processor is configured to adjust the thermostat relay to a closed position to supply the power to the thermostat and enable the normal operating mode via the thermostat.

15. The HVAC system of claim 12, wherein the heat exchanger comprises an evaporator configured to exchange heat between the air flow and the refrigerant.

* * * * *